UNITED STATES PATENT OFFICE.

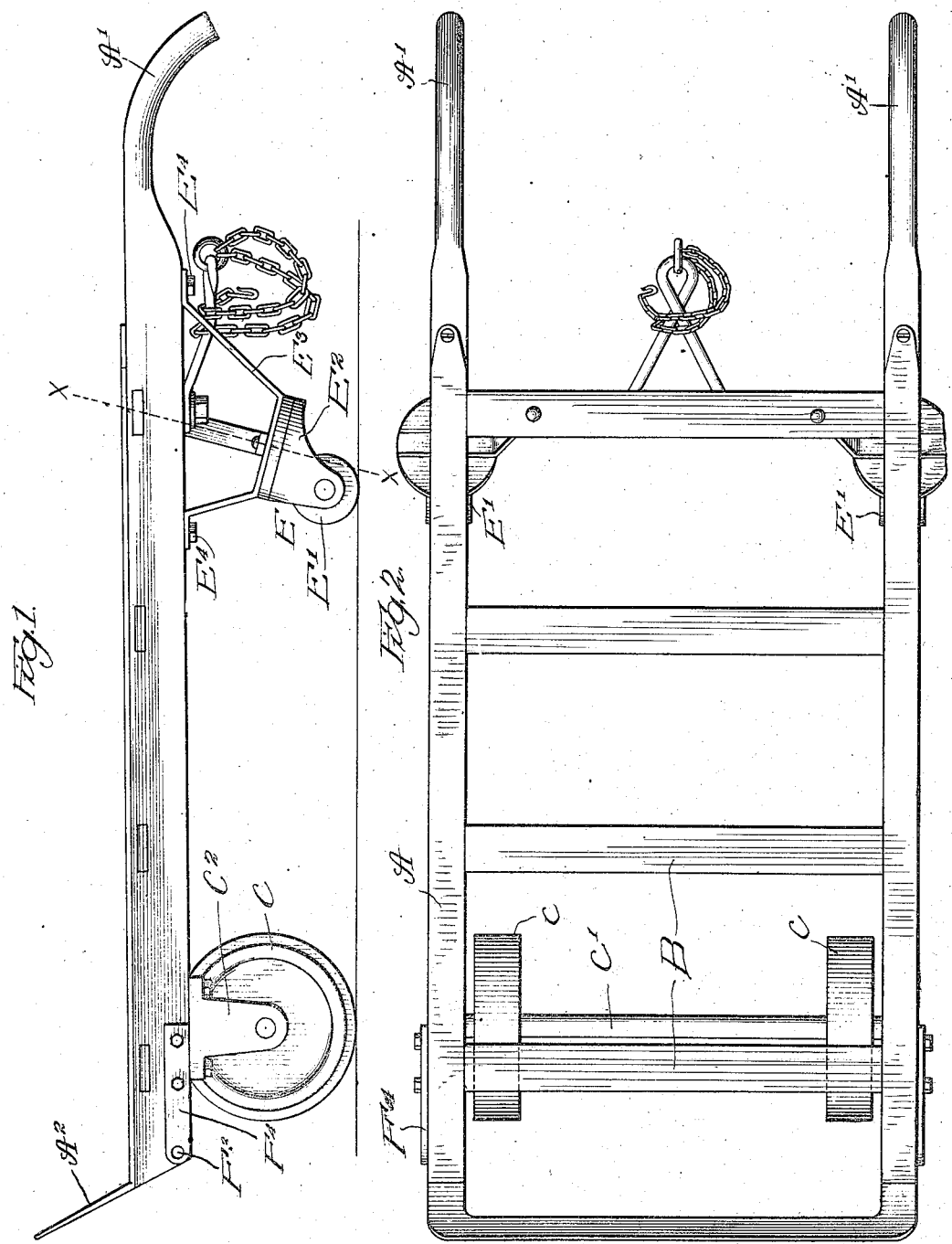

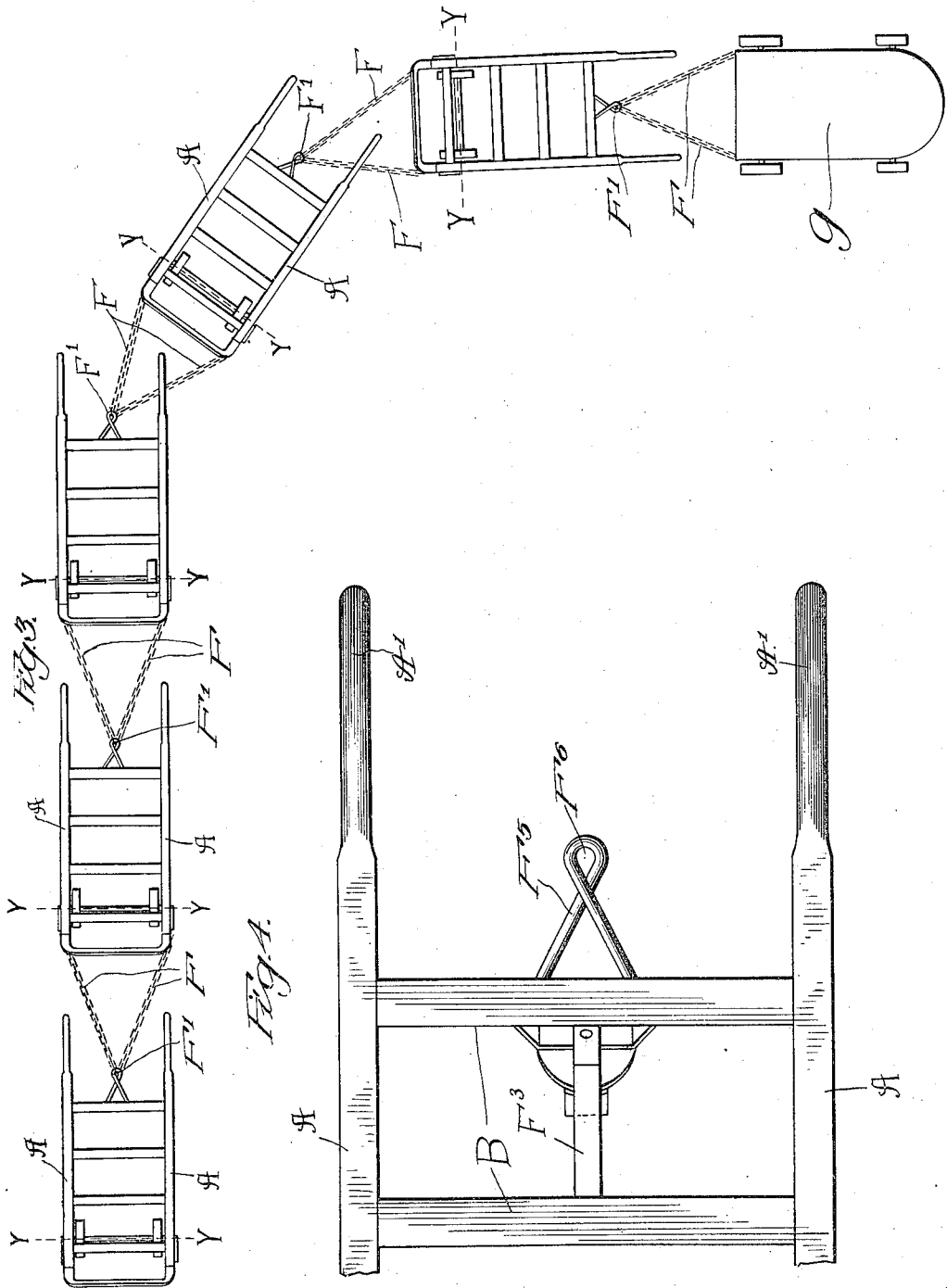

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

HAULAGE SYSTEM AND APPARATUS.

1,197,007. Specification of Letters Patent. Patented Sept. 5, 1916.

Application filed August 1, 1914. Serial No. 854,436.

*To all whom it may concern:*

Be it known that I, GEORGE W. BULLEY, a citizen of the United States, and resident of Chicago, county of Cook, State of Illinois, have invented certain new and useful Improvements in Haulage Systems and Apparatus, of which the following is a specification.

My invention relates to improvements in systems and apparatus for handling, transporting and transferring freight, merchandise and the like.

One of the objects of my invention is to provide an improved system and apparatus of this character which will simplify, facilitate and economize the loading and unloading of vessels, cars and the like, and the handling, transporting or transferring of freight, merchandise and the like about the docks, wharves, freight platforms and warehouses.

Other objects of my invention will appear hereinafter.

Referring to the accompanying drawings, Figure 1 is a view, in side elevation, of a unit hand or portable truck constructed in accordance with my invention; Fig. 2 is a top plan view thereof; Fig. 3 is a similar view of a portion of said truck modified in construction; and Fig. 4 is a view of a plurality of said trucks connected together in a train.

In loading and unloading vessels and cars, and in handling or transferring freight, baggage and merchandise about the docks, wharves, freight platforms and warehouses where the vessels or cars are positioned for this purpose, it is the universal practice to use small individual hand trucks, each one of which requires a man to handle it. These trucks are pushed into the car or vessel, loaded with merchandise and then pushed or pulled, as the case may be, to the place where the merchandise is to be placed, and then unloaded. After he unloads his truck, the man returns to the original place with his truck empty, and repeats the loading and unloading operation. This method is expensive and inefficient, not only because each truck requires one man to handle it, but also because half of the distance traveled by the man and truck is done with an empty truck. This is particularly the case where the man after loading his truck often has to push the truck a distance of several hundred feet along the freight platform or wharf, and return with the empty truck the same distance. In common practice, furthermore, a great part of the time the freight is unloaded from a car or vessel and transferred in this manner to the platform, from which it must be again loaded on these trucks and transferred to another car or vessel. In other words, the freight must be handled twice in the operation of unloading one car or vessel and loading another. It is readily seen, therefore, that although this is the universal practice in handling freight and merchandise, it is notoriously inefficient and expensive, requires a great deal of individual labor, and wastefully consumes the time and energy of men in traveling at least half the distances with empty trucks. The individual-man-per-truck system, however, has the important advantage that the truck can be wheeled right into the cars or vessels to the exact place where it is to be loaded and then wheeled to the exact place where it is to be unloaded. The inefficiency of the system occurs mostly where the trucks have to be pushed long distances by the men and returned empty the same distance. The trucks used for this purpose are universally standard and consist generally of a flat open-work mounted upon a pair of wheels or rollers on one end thereof. The other end of this framework is provided with suitably-formed handles by which the man may lift the frame to the proper angle and push or pull it along on its forward wheel supports. One of these trucks is illustrated in Figs. 1 and 2. In these drawings it will be seen the rectangular flat frame comprises side bars A and several parallel spaced cross-bars B. Corresponding ends $A^1$ of the side are rounded off and turned downwardly to form suitable grips or handles. The other end of the frame is supported, as is well known, by wheels or rollers C, spaced apart and mounted to rotate independently upon a transverse axle $C^1$. This axle is held in the brackets $C^2$ secured to the under side of the bars A. This end of the truck also has an angularly up-standing back $A^2$. The structure just described is that of the standard truck commonly in use. In using trucks of this character it is well known that the man grasps the handles and raises the truck to an angular position, supported at its lower end by the wheels or rollers C, in which position he pushes or pulls the truck along.

My invention contemplates the equipping and arranging of these standard trucks in such manner that their use as individual or unit trucks will not be interfered with in the least, but that after said trucks are loaded, a plurality of them may be separably or detachably connected together in series to form a flexible train which may be drawn by a suitable motive power, such as a tractor, to the place where the trucks are to be unloaded, thus making it unnecessary for each man to travel with his truck.

In accordance with my improved system, a group of men may be employed at the loading end, loading trucks and simply connecting them in train relation, and another group at the unloading end, unloading the trucks. I prefer to use the standard hand trucks, and in fact my improved system contemplates the equipping and arranging of the standard trucks already in use to adapt them for use both as individual or unit trucks as at present, and as components of a train. In carrying out my invention I provide each of these trucks with an additional rotary support adjacent the end opposite the end at which the wheels C are positioned, for the purpose of enabling the handle-end of the truck to be lowered and the truck to be drawn or propelled along as a component vehicle of a train. In addition to this, I provide these trucks with means whereby they may be connected together in series in a train. In the structure shown in the drawings, these additional supports are in the form of casters E comprising rollers $E^1$ journaled in brackets $E^3$. These casters are swiveled on frame $E^3$ which are secured in any suitable manner, as by means of the bolts $E^4$, to the under edge of the side bars of the truck frame. The casters are preferably positioned substantially beneath the cross-bar nearest the handle-end of the truck, although the positioning of these casters depends upon the particular truck structure used. They are, however, preferably at some distance in from the handles $A^1$ of the frame, so as not to interfere with the usual handling of the truck by the man. I prefer to provide one of these casters at each side of the frame, as shown in Figs. 1 and 2, thus making in effect a truck or vehicle which will have four points of support, but if desired a single caster, such as shown in the modified structure in Fig. 4, may be used. In such case, the single caster is attached, by means of the frame $E^3$ to the two cross-bars of the frame midway of the width of the frame. The two casters, however, have the advantage over the single caster in that should the load be unevenly distributed on the truck, the truck will be less likely to tilt. The casters and their frames $E^3$ are preferably of such height that when the truck is lowered on to them they will support the frame in almost a horizontal position, the frame being inclined upwardly in the direction of the handle-end. As before mentioned, the casters are swiveled on the frames $E^3$ so that they may adapt themselves to the direction of movement imparted to the truck. I prefer, when the trucks are connected in a train, to draw them along handle-end foremost, and I incline the axes on which these casters swivel or rotate downwardly rearwardly, that is, in the direction opposite to that in which the trucks move or travel, these inclined axes being indicated by the dotted line $x—x$ in Fig. 1. The horizontal axes on which the caster wheels $E^1$ rotate are also offset slightly in the same direction with respect to inclined axes $x—x$. The purpose of this arrangement is to cause the casters to "track," so to speak, in a straight line. In other words, with these inclined axes, the weight of the truck and the load causes the casters to yieldingly resist turning out of the straight line in which the truck travels until sufficient force is applied laterally to overcome this resistance and divert the truck from its straight line of movement. This operates in conjunction with the connections between the trucks to cause the trucks in the train to follow practically the exact line of movement of the tractor or other motor power regardless of the sharp turns or curves which said tractor may make.

The trucks, are adapted to be connected in train relation (Fig. 3), and any number of them may so be connected, consistent with the particular conditions. Any suitable means may be employed for so connecting the trucks. I prefer, however, to use flexible connections such as the chains F. One end of each of the chains F is adapted to be joined and connected with another chain F at a point $F^1$ midway of the width of the frame of the truck, and the other end of each chain is detachably-connected to the opposite rear corners of the next truck in the series. This may be conveniently done by providing said ends of the chains with hooks F² which may be hooked into the holes F³ in the bars F⁴ attached to the frame of the truck. These chains may also be detachably connected to the truck at the points F¹ and carried separately from the trucks when not in use, but they are likely to be lost; hence I prefer that they be permanently connected to the points F¹, so that they may be loosely looped up on the truck when the truck is being handled individually by a man. I connect these trucks in series so that the axes of the rear wheel C (represented by the dotted lines $y$—$y$) of each truck, is substantially intermediate or midway between the point F¹ of its own truck and the point F¹ of the next succeeding truck in the series. It will also be noted that by reason of this arrangement the point of connection F¹ is substantially midway between the axes $y$—$y$ of two adjacent trucks in the series. This method of connecting and relating the trucks is extremely important. In practice these trucks in a train will follow one behind the other, each truck moving in practically the identical path of the preceding truck. The tractor or other motive power, generally indicated by the letter G, may travel in a tortuous path having extremely sharp bends or curves and all of the trucks in the entire series or train will trail along in practically the identical path. The reason for this is that the spacing of the points of connections F¹ with respect to the axes $y$—$y$ of the wheels causes the wheels C to serve as pivots, so to speak, about which the trucks bodily swing when turning curves or bends, as shown in Fig. 3, and the truck which is making a turn will exert a pull upon the succeeding truck. The succeeding truck, however, will continue to travel in a substantial straight line by reason of the inclination of the caster axes $x$—$x$, as before explained, until it reaches substantially the position in which the preceding truck began to turn and it will then make the turn just as the preceding truck did.

The means forming the points of connection F¹ in the structure shown are simply rods F⁵ secured to the cross-bars B of the frame and twisted to form convenient eyelets F⁶ to which the chains F are attached, these eyelets being extended outwardly far enough to properly space the points of connection F¹ with respect to the axes $y$—$y$.

I claim:

1. In a system of the class described, the combination of a plurality of hand trucks having wheel supports adjacent one end and adapted to be arranged in train relation, means connected at transversely separated points to each truck adjacent its wheel supports and to the next succeeding trucks at a single point, the single points of connection of the several trucks being equidistant from the wheel supports, and means supporting the other ends of the trucks.

2. In a system of the class described, the combination of a plurality of individual hand trucks having wheel supports on a transverse axis adjacent one end, connections between two transversely separated points on one truck adjacent its wheel supports and a single point on the succeeding truck, the single points of connection being equidistant from the axes of the wheel supports, and means supporting the other ends of the trucks.

3. In a system of the class described, the combination of a plurality of individual hand trucks having wheel supports on a transverse axis adjacent one end, connections between two transversely separated points on one truck adjacent its wheel supports and a single point on the succeeding truck, the single points of connection being equidistant from the axes of the wheel supports, handles on the other ends of said trucks by which said other ends may be raised when the trucks are operated as individual hand trucks, and supports at the handled ends of said trucks for supporting said ends when the trucks are operated in train relation.

4. In a system of the character described, the combination of a plurality of individual hand trucks detachably connected together in train relation and having wheel supports adjacent one end, the wheels of each truck being midway of the points of connection of the trucks with each other, and additional supports for said trucks substantially at the points of connection of one truck with the next succeeding truck.

5. The combination of a plurality of vehicles capable of operation in train relation having wheel supports on transverse axes, a hitch member for each vehicle connected thereto at transversely separated points and to the adjacent vehicle at a single transversely central point, the transverse axes of the wheel supports of two adjacent vehicles being substantially equidistant from said single central point of connection between said vehicles, and additional wheel supports for the vehicles spaced from said first mentioned wheel supports longitudinally of the vehicles and positioned adjacent the ends of the vehicles.

6. The combination of a plurality of individual vehicles adapted for operation in train relation and having wheel supports arranged on transverse axes, a flexible chain-hitch for each vehicle connected to the rear end of said vehicle at transversely separated points thereon, and connected to the forward end of the succeeding vehicle at a transversely central point substantially the same distance longitudinally from the transverse axis of the wheel support of said succeeding vehicle as said single point of connection is spaced longitudinally from the transverse axis of the wheel support of the preceding vehicle, and a caster wheel supporting one end of each vehicle and spaced longitudinally from the transverse axes of the wheel support of said vehicle.

In witness whereof, I hereunto subscribe my name this 29th day of July A. D., 1914.

GEORGE W. BULLEY.

Witnesses:
 JOHN W. DUNCAN,
 ALT. H. BITZER.